2,862,022
DINITROALKYLPHENYL METHACRYLATES

Richard S. Cook, Rockledge, and Charles H. McKeever, Meadowbrook, Pa., assignors to Rohm & Haas Company, Philadelphia, Pa., a corporation of Delaware No Drawing. Application June 1, 1956
Serial No. 588,608

1 Claim. (Cl. 260—479)

This invention concerns dinitro-hydrocarbon-substituted phenyl methacrylates in which the hydrocarbon group contains six to nine carbon atoms. The hydrocarbon group may be alkyl of six to nine carbon atoms, cyclohexyl including cyclohexyl substituted with one or more small alkyl groups, and the phenyl group which may also have one or more alkyl substituents.

It was proposed by Hester and Craig to prepare capryldinitrophenyl crotonate for use as a pesticidal agent on plants. This compound has proved quite effective for controlling mites and various fungi on plants without serious phytotoxicity if the compound is carefully manufactured and formulated for application at relatively low concentrations. Success of this compound has recently been found to depend on a balance of factors which include the size, nature, and position of the hydrocarbon substituent of the phenyl ring and upon the particular acid residue used. Effectiveness may change abruptly and unpredictably with deviations in these factors.

We have prepared esters of dinitrophenols and methacrylic acid which are remarkably effective against mites and various fungi when the phenyl ring has a hydrocarbon substituent of six to nine carbon atoms. These esters are less critical as to the exact form, size, and position of this hydrocarbon substituent than the previously known ester referred to above and have other distinctions which could not have been foreseen.

The dinitrophenols which can be here used have as a ring substituent a hexyl, heptyl, octyl, nonyl, phenyl, tolyl, ethylphenyl, isopropylphenyl, cyclohexyl, methylcyclohexyl, or trimethylcyclohexyl group. The phenyl and cyclohexyl groups thus contain not over nine carbon atoms. The alkyl groups may be straight-chained or branched. The hydrocarbon substituent is usually ortho or para to the phenolic hydroxyl group.

The preparation of dinitro-derivatives of hydrocarbon-substituted phenols is known. In most cases, these phenols can be reacted in acetic acid with nitric acid at moderate to low temperatures. In a few cases the phenol can be more effectively nitrated by first reacting with sulfuric acid and then with nitric acid or a soluble salt of nitric acid. When the dinitrohydrocarbon-substituted phenol is solid, it can be purified by crystallization.

The dinitroalkylphenol, dinitrophenylphenol, or dinitrocycloalkylphenol may be reacted with an alkali to form the alkali metal phenate which is in turn reacted with a methacryloyl halide, either bromide or chloride being satisfactory. The phenates can be formed, for example, by reacting the phenol in solution, as in an alcohol, with an equivalent amount of an alkaline reagent, such as sodium or potassium hydroxide. In another way, to form the phenate, the phenol is slowly added to a warm (30° to 60° C.) aqueous 25% to 50% sodium hydroxide solution in an equivalent amount or in excess or to a stronger solution.

The phenate is reacted with methacryloyl chloride or bromide in a volatile, inert organic solvent, such as a low boiling naphtha, between 10° and 80° C. or even higher temperature. The solvent solution can then be treated with water or with aqueous acid or alkali solution. The washed solution is evaporated to yield a residue which is technical hydrocarbon-substituted dinitrophenyl methacrylate.

In another way of forming a phenate, a hydrocarbon-substituted dinitrophenol is treated with a tertiary amine, such as triethanolamine, benzyldimethylamine, pyridine, triethylamine, or triamylamine, in the presence of an inert organic solvent, such as naphtha or toluene. This mixture is treated at 10° to 50° C. with α-methacryloyl chloride or bromide with the reaction being completed between 20° and about 100° C. The amine hydrohalide is washed away with water and the product worked up.

Typical preparations are described in the following examples which are presented for purposes of illustration and not by way of limitation. Parts are by weight unless otherwise designated:

Example 1

To a stirred solution of 2,4-dinitro-6-caprylphenol (154 parts) in 115 parts of octane is added with cooling 81.5 parts of benzyldimethylamine over a period of 40 minutes with the temperature maintained at 25° to 30° C. To the resulting slurry is added during 30 minutes 60.1 parts of methacryloyl chloride with cooling to maintain the mixture at 25° to 30° C. The slurry is then agitated at 60° C. for 90 minutes. After the reaction mixture is cooled to 25° C., 200 parts of water are added and the mixture is agitated for 10 minutes, giving two liquid phases. The lower layer is removed and the washing procedure is repeated four times using 200 parts of water per wash. The octane is removed by distillation at reduced pressure (20 mm.), yielding 191 parts of red oil which is identified as 2,4-dinitro-6-capryphenyl methacrylate. The yield is 100% of theory. Acid number and saponification number indicate a purity of 94%.

The capryl group in the above compounds is the 2-octyl group.

Example 2

In the same way, there is reacted 2,6-dinitro-4-tert-octylphenol in place of the above phenol. A similar product is obtained as an oil which, by analysis, corresponds to 2,6-dinitro-4-tert-octylphenyl methacrylate.

Example 3

In the same way, 160 parts of 2,6-dinitro-4-nonylphenol is reacted in 125 parts of octane. The product, an oil, is obtained in similar high yield and purity and is 2,6-dinitro-4-nonylphenyl methacrylate.

Example 4

The same procedure is followed with 134 parts of dinitrohexylphenol in which the hexyl group occurs in the para position in major part with the balance in the ortho position, the hexyl group being a branched chain. An oil is obtained as a residue which, by analysis, corresponds to dinitrohexylphenyl methacrylate.

Example 5

To a stirred solution of 2,4-dinitro-6-cyclohexylphenol (133.3 parts) in 500 parts of benzene was added with cooling 76 parts of benzyldimethylamine over a period of 20 minutes with the temperature maintained at 25° to 30° C. To the resulting slurry was added 55 parts of methacryloyl chloride during 30 minutes at 25° to 30° C. The mixture was then heated with stirring for 90 minutes at 60° C. After the mixture was cooled to 25° C., 200 parts of water were added and the mixture was agitated for 10 minutes, giving two liquid phases. The lower layer was removed and the organic layer was washed four times using 200 parts of water per wash. The benzene was removed by distillation at reduced pressure giving 162 parts of red oil which solidified on cooling. Recrystallization from 250 parts of isopropyl alcohol yielded 140 parts of a yellow solid having a melting point of 84° to 85° C. and corresponding in composition to 2,4-dinitro-6-cyclohexylphenyl methacrylate. The yield was 84% of theory.

This product was at least 97% pure as shown by acid number and saponification number.

The above procedure when repeated with 2,6-dinitro-4-cyclohexylphenol yields 2,6-dinitro-4-cyclohexylphenyl methacrylate which is a yellow solid melting at 75° to 79° C.

Repetition of the procedure with one or more methyl substituents on the cyclohexyl group leads to very similar products.

*Example 6*

In a manner similar to that of Example 2, there were reacted at about 30° C. 44 parts of 2,4-dinitro-6-phenylphenol dissolved in 250 parts of benzene, 25.5 parts of benzyldimethylamine, and 18.5 parts of methacryloyl chloride. The reaction mixture was well washed and the solvent was distilled off to give 47 parts of a yellow solid. Recrystallization from 200 parts of isopropyl alcohol yielded 34 parts of yellow solid, melting at 121° to 122° C. and corresponding in composition to 2,4-dinitro-6-phenylphenyl methacrylate. The yield was 63% of theory. By acid number and saponification number, this product had a purity of 95%.

Other dinitrophenylphenols in which one or more small alkyl groups may be present on the phenyl substituent may be reacted in the same way to give comparable products.

The esters of methacrylic acid and a dinitro-hydrocarbon-substituted phenol with six to nine carbon atoms in the hydrocarbon substituent are mixed with a diluent, extender, or carrier to provide compositions useful in the pesticide field for use on plants. The proper compounding of these materials is important in order to provide the maximum effectiveness against fungi, mites, or insects with a minimum of phytotoxicity to living plants.

The compounds of this invention must be mixed with extender and carrier for application in sprays or dusts. For use in sprays, they may be used in the form of an emulsifiable concentrate or a wettable powder, either of which forms can be diluted with water.

A typical emulsifiable concentrate is made with a solvent and a solvent-soluble emulsifying agent. The active agent may be 25% to 50% or more of this type of composition and there may also be present wetting and/or sticking agents. A satisfactory composition is constituted as follows: a defined dinitro-hydrocarbon-substituted phenyl methacrylate 50.0%, xylene or methylated naphthalene 42.4%, and 7.6% of a wetting-emulsifying mixture supplying 3.2% of calcium dodecylbenzenesulfonate, 3.2% of octylphenoxypolyethoxyethanol, and 1.2% of methanol. Such an emulsifiable concentrate is stirred into water to supply the nitrophenyl ester at concentrations of about 0.01 lb. to 2 lbs. per 100 gallons, the amount of nitrophenyl ester being always kept at the lowest level which will permit control of disease or pest.

Useful wettable powders may be made by mixing a nitrophenyl ester with an inert, finely-divided solid and with wetting and dispersing agent or agents. A typical composition consists of 25 parts of a nitrophenyl ester of this invention, 70 parts of a finely-particled clay, 3 parts of a dispersing agent such as sodium condensed naphthalene-formaldehyde sulfonate, and 2 parts of a water-soluble octylphenoxypolyethoxyethanol. In another formulation, there is used 26 parts of a said ester, 71 parts of a precipitated silica, 2 parts of the sodium salt of a maleic acid-olefin copolymer of molecular weight 3500, and one part of an octylphenoxypolyethoxyethanol wetting agent.

While a prime use of such wettable powders is for extension with water to provide sprays, they may also be extended with inert solids to provide dusts. For example, one part of one of the above wettable powders is diluted with two parts of pyrophyllite to give a useful and effective dust. Dusts may supply a said ester at a concentration from 1% to about 10% or more and are preferred by some for their ease of application.

The said ester may be used as the sole toxicant or may be supplemented with another fungicide, miticide, or insecticide, to provide a wide spectrum of action.

In standard fungitoxicity tests, esters of this invention show a high degree of effectiveness against typical test organisms. In this type of tests, lacquered slides are treated with dispersions of the compound under test over a range of dilutions. Note is made of the percentage inhibition of germination of spores, the $LD_{50}$ values, and the slope of the germination-dilution curve. In the case of the dinitroalkylphenyl methacrylates, complete inhibition of germination is found at 0.1% with both *Stemphylium sarcinaeforme* and *Monilinia fructicola*. While inhibiting action against the latter organism does not persist on dilution, action against the former tends to fall off on dilution but persists against the former at successive dilutions. Thus, inhibitory action is observable even at 0.0001%. An $LD_{50}$ value of 5 p. p. m. has been found. This compares with $LD_{50}$ values between 100 and 1000 for dinitrocaprylphenyl crotonate. Dinitrophenylphenyl methacrylates give values essentially the same as above, while dinitrocyclohexylphenyl methacrylates give almost as good values.

Tests were made for powdery mildew control on bean plants. Here the numbers of mildew lesions developing on 12 primary leaves of six bean plants were counted, both for untreated plants and for plants sprayed at various dilutions of the esters of this invention. The number of lesions was greater than 1000 for the unsprayed control plants. For plants sprayed with various esters of this invention, there were no lesions down to and including dilutions of 0.25 lb. per 100 gallons. At 0.12 lb. per 100 gallons, there were no lesions for plants sprayed with the dinitroalkylphenyl methacrylates or dinitrophenylphenyl methacrylate, but there were 69 lesions on plants sprayed with 2,4-dinitro-6-cyclohexylphenyl methacrylate. At 0.06 lb./100 gallons, there were found 25 lesions on plants sprayed with 2,4-dinitro-6-phenylphenyl methacrylate. But, in all cases, and for any of the dinitroalkylphenyl, dinitrocyclohexylphenyl, or dinitrophenylphenyl methacrylates, there is 60% to 90% control of powdery mildew on beans even at 0.014 lb. per 100 gallons.

The compounds of this invention are unusually effective against various kinds of mildews and are effective at levels and rates of application which are safe for the plants. Mildews on flowers, vegetables, field crops, fruit trees, and ornamentals may be prevented or even eradicated, in some cases, with sprays containing 1/64 to 1/8 lb. per 100 gallons. On fruit trees, application rates of not over 6 to 8 lbs. per acre can be used without going beyond the phytotoxic limit. On vegetables and flowers, rates should be kept within one to two lbs. per acre.

Tests were made in the laboratory for the control of typical insects on plants. Again, a range of dilutions was used and the effective concentrations determined. These vary with the insect. For example, 2,4-dinitro-6-caprylphenyl methacrylate gave an 87% kill of armyworm when applied at 2 lbs. per 100 gallons, while the corresponding crotonate gave a 47% kill. Kills at one lb. per 100 gallons were 60% for the former and 27% for the latter. There was evidence of phytotoxicity at this and higher levels under some, but not all, conditions.

Against the bean beetle, the former gave a kill of 97% and the latter a kill of 77% when each was used at 0.5 lb. per 100 gallons.

Against the black bean aphid, the former gave a kill of 100% at 0.25 lb. and 72% at 0.125 lb. per 100 gallons, while the latter gave 58% and almost zero respectively. Similar or better kills are obtained with any of the other esters of this invention.

Against mites, the former gave a 100% kill and the latter an 81% kill at 0.06 lb. per 100 gallons; while at 0.03 lb. per 100 gallons the respective kills were 95% and 68%, and at 0.016, 69% and 50% respectively. Other dinitroalkylphenyl methacrylates with alkyl groups from hexyl to nonyl are of about the same effectiveness against mites.

Against mites, 2,4-dinitro-6-cyclohexylphenyl methacrylate is unusually effective. In standard tests, it gave 100% kill of mites at dilutions of 0.5, 0.25, 0.125, and 0.062 lb. per 100 gallons. At 0.031 lb. per 100 gallons, the kill was 95% and at 0.016 lb. per 100 gallons, the kill was 89%. This is an unusual control at such dilutions and permits this compound and others like it to be used at low dilutions with good control of mites, mildews, and other diseases without any evidence of phytotoxocity. This compound is also active against bean beetle larvae, but requiring for this purpose one to one-fourth pound per 100 gallons, giving a 97% kill at one lb. per 100 gallons.

In tests for chemotherapeutic action, some degree of protection was noted against bean rust. Soil about plants was treated with dispersions containing 1 to 60 p. p. m. of various typical compounds of this invention. Later leaves were inoculated and the index of disease determined. All treated plants showed more resistance than the untreated controls. No phytotoxic effects resulted in these tests.

Similar tests with fusarium wilt on tomatoes showed more resistance than the untreated controls. No phytotoxic effects resulted in these tests.

Similar tests with fusarium wilt on tomatoes showed a reduction in effects of disease when the 15 to 60 p. p. m. dilutions were applied to soil, 60 p. p. m. being the most concentrated suspension examined in this particular series of tests.

Most compounds of this invention may be summarized by the structure.

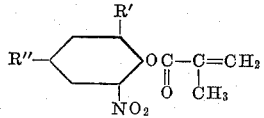

wherein one of the R groups is $NO_2$ and the other is a member of the class consisting of alkyl groups of six to nine carbon atoms, phenyl and alkylphenyl groups of not over nine carbon atoms, and cyclohexyl and alkylcyclohexyl groups of not over nine carbon atoms.

We claim:

The compound

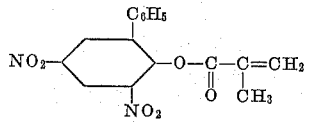

where $C_6H_5$ is the phenyl group.

References Cited in the file of this patent
UNITED STATES PATENTS 2,526,660　　Hester et al. _____ Oct. 24, 1950

FOREIGN PATENTS 1,025,153　　France _____ Jan. 21, 1953